April 6, 1926. 1,579,275
C. D. ZEIGLER
CHRISTMAS TREE HOLDER
Filed July 22, 1925
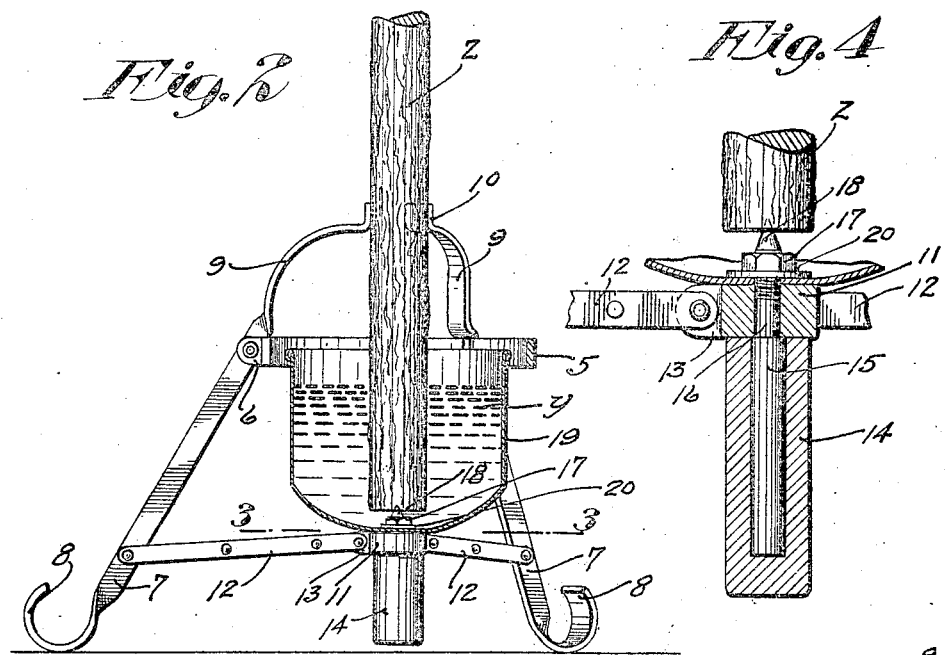
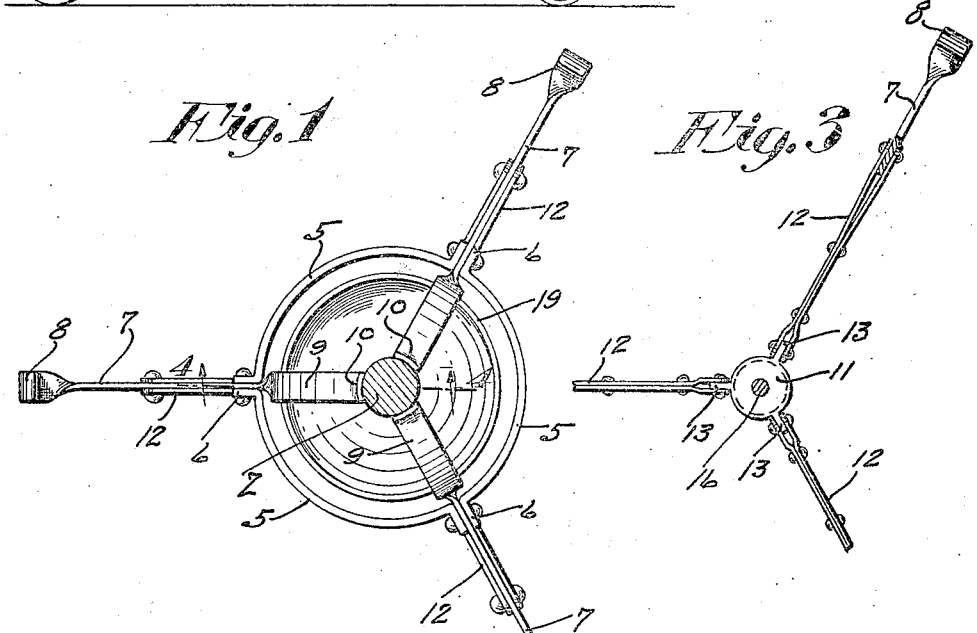
Inventor
Charles D. Zeigler
By his Attorneys
Merchant and Kilgore Patented Apr. 6, 1926.

1,579,275

UNITED STATES PATENT OFFICE.

CHARLES D. ZEIGLER, OF ST. PAUL, MINNESOTA.

CHRISTMAS-TREE HOLDER.

Application filed July 22, 1925. Serial No. 45,233.

*To all whom it may concern:*

Be it known that I, CHARLES D. ZEIGLER, a citizen of the United States, residing at St. Paul, in the county of Ramsey and State of Minnesota, have invented certain new and useful Improvements in Christmas-Tree Holders; and I do hereby declare the following to be a full, clear, and exact description of the invention, such as will enable others skilled in the art to which it appertains to make and use the same.

My invention has for its object to provide a highly improved Christmas tree holder which, in its preferred form, is provided with a water pot arranged to receive the butt end of a tree to supply moisture thereto and thereby keep the tree green and prevent premature shedding of the needles.

To the above end, the invention consists of the novel devices and combinations of devices hereinafter described and defined in the claims.

In the accompanying drawings, which illustrate the invention, like characters indicate like parts throughout the several views.

Referring to the drawings:

Fig. 1 is a plan view of the invention and illustrating in section the butt end of a Christmas tree held therein;

Fig. 2 is a view partly in elevation and partly in central vertical section;

Fig. 3 is a fragmentary view partly in plan and partly in horizontal section taken on the line 3—3 of Fig. 2; and Fig. 4 is a fragmentary detail view with some parts sectioned on the line 4—4 of Fig 1, on an enlarged scale.

The numeral 5 indicates an annular horizontal body member comprising three segments, the ends of which are bent radially outward and circumferentially spaced to afford three pairs of hinge lugs 6. Diverging supporting legs 7 have their upper ends inserted between the lugs 6 of each pair and pivoted thereto for radial swinging movement. The lower ends of the supporting legs 7 are curved outwardly and upwardly to afford feet 8 that rest or slide on a floor without scratching or marring the same.

Formed with the upper ends of the supporting legs 7 are converging tree-gripping prongs 9, the inner or upper ends of which are bent upward to afford relatively wide gripping fingers 10 that are circumferentially spaced around the projected axis of the body member 5 and extend substantially parallel thereto. These gripping fingers 10 are preferably formed, as shown in Fig. 1, on the arc of a circle so as to contact with the body of a Christmas tree Z throughout their entire width.

A horizontal disc-like supporting head 11 is located materially below the body member 5, axially aligned therewith and connected by links 12 to the supporting legs 7. Each link 12 comprises a pair of flat bars, the intermediate portions of which bear the one upon the other and are rigidly connected by rivets. The inner ends of the members of the links 12 are spread to receive radial lugs 13 on the supporting body 11 and pivotally connected thereto. Likewise the outer end portions of the members of the links 12 are spread to receive the supporting legs 7 and pivoted thereto. These links 12 connect the supporting head 11 to the supporting legs 7 for raising or lowering movements.

To limit the downward movement of the supporting head 11, the same is provided with a depending cylindrical stop 14 of wood or any other suitable material that will not scratch or mar a floor. This stop 14 is secured to the supporting head 11 by a metal core 15 that extends axially into said stop in the top thereof with its upper end terminating at the top of said stop and engaging the bottom of the supporting head 11 as a stop. Formed on the upper end of the core 15 is a screw-threaded stem 16 of a reduced diameter that extends through an axial bore in the supporting head 11 and has a nut 17 applied thereto which securely draws the upper end of the core 15 into engagement with the under side of the supporting head 11 and thereby rigidly secures the stop 14 to said supporting head. The upper end of the stem 16 extends above the nut 17 and is of conical formation to afford a tree-centering barb 18 on which the lower end of the Christmas tree Z rests. The length of this stop 14 is such as to come in contact with the floor just before the links 12 are moved into true horizontal position to prevent the same from moving beyond a dead center and thereby draw the supporting legs 12 inward and open up the tree-gripping prongs 9.

Mounted on the supporting head 11 is a water pot 19 preferably formed from aluminum and having a dished bottom. This water pot 19 is rigidly secured to the supporting head 11 in axial alignment with the body member 5 by the stem 16, which extends through an aperture in the bottom of said water pot, and the nut 17. A gasket 20 is interposed between the nut 17 and bottom of the water pot 19 to prevent leakage of the water Y from said water pot. The diameter of the water pot 19 is such as to freely move axially within the body member 5 during the raising or lowering movements of said water pot.

By moving the supporting body 11 upward, the connecting links 12 will fold the leg 7 circumferentially around the water pot 19 so that the Christmas tree holder can be stored or packed in a comparatively small space.

To mount a Christmas tree in the holder, the supporting head 11 is moved axially toward the body member 5 to spread the gripping fingers 10. The butt end of the tree Z is then inserted between said fingers until brought into engagement with the barb 18. The tree Z is then pressed downward between the gripping fingers 10 and which movement by the engagement of said tree with the barb 18 moves the supporting head downward and spreads the legs 7 by the links 12 and causes the gripping fingers 10 to tightly engage circumferentially around the Christmas tree Z before the stop 14 engages the floor. The water pot 19 is then filled with water.

By shifting the lower cut end of the Christmas tree Z on the barb 18, said tree may be set in a true upright position, or if said tree is crooked, the butt end thereof may be shifted on said barb to hold said tree upright.

The Christmas tree holder will be supplied in different sizes for holding trees of different sizes.

What I claim is:

1. A Christmas tree holder comprising a body member, supporting legs attached to the body member for spreading and contracting movements and having tree-gripping prongs arranged to partake of reverse movements from that of said legs, and a Christmas tree-supporting head attached to the supporting legs for vertical movement in respect thereto and operative to spread said legs by a downward movement and contract the same by an upward movement.

2. A Christmas tree holder comprising a body member, supporting legs attached to the body member for spreading and contracting movements and having tree-gripping prongs arranged to partake of reverse movements from that of said legs, a Christmas tree-supporting head, and links connecting said head to the supporting legs above a dead center for raising and lowering movements, the weight of the Christmas tree on the supporting head tending to move said head down and cause the links to spread the supporting legs and contract their prongs onto said tree.

3. The structure defined in claim 2 in further combination with a positive stop arranged to prevent the supporting head from being moved below a dead center.

In testimony whereof I affix my signature.

CHARLES D. ZEIGLER.